J. H. BALKEMA.
HAND BRAKE FOR TRUCKS.
APPLICATION FILED DEC. 14, 1914.

1,177,373.

Patented Mar. 28, 1916.
2 SHEETS—SHEET 1.

Inventor
J. H. BALKEMA.

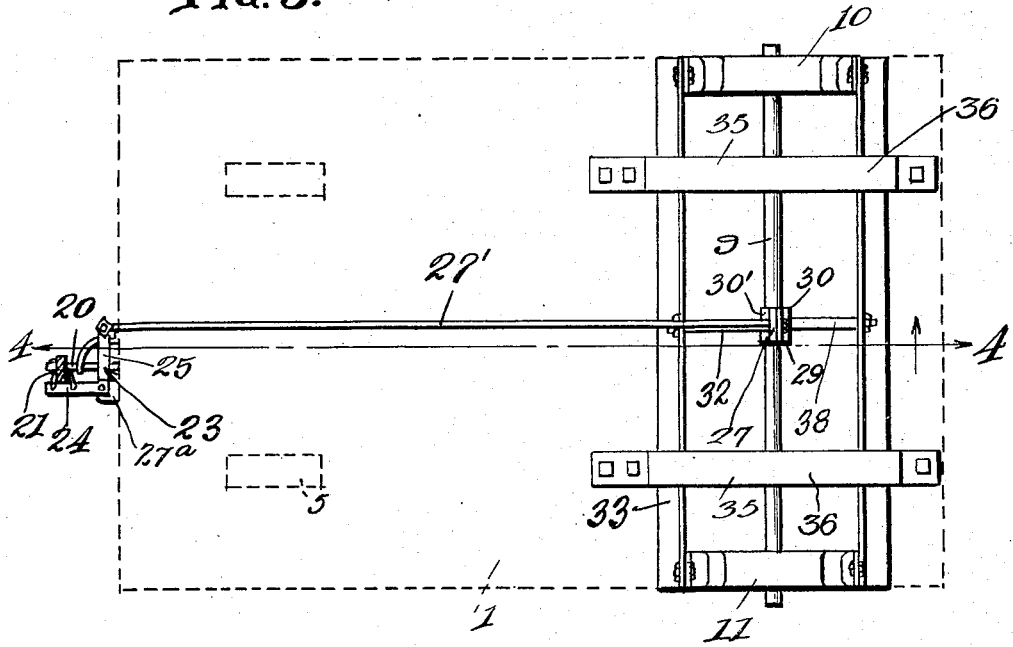
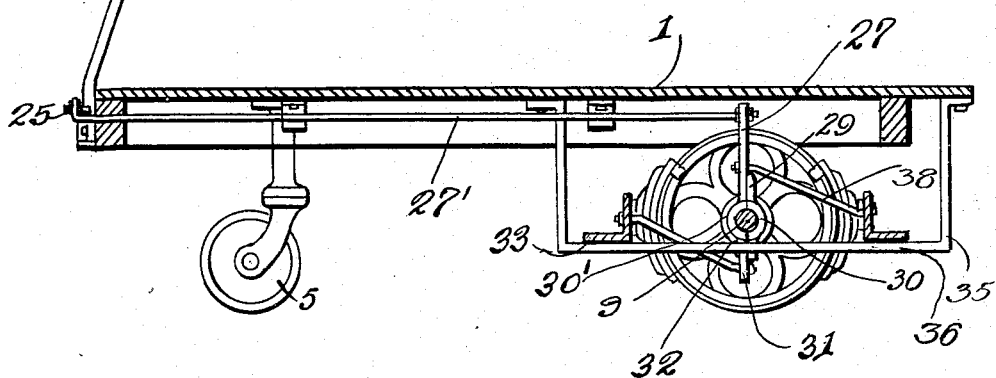

UNITED STATES PATENT OFFICE.

JACOB H. BALKEMA, OF GRANDVILLE, MICHIGAN.

HAND-BRAKE FOR TRUCKS.

1,177,373.  Specification of Letters Patent.  Patented Mar. 28, 1916.

Application filed December 14, 1914. Serial No. 877,225.

*To all whom it may concern:*

Be it known that I, JACOB H. BALKEMA, a citizen of the United States, residing at Grandville, in the county of Kent and State of Michigan, have invented certain new and useful Improvements in Hand-Brakes for Trucks; and I do hereby declare the following to be a full, clear, and exact description of the invention, such as will enable others skilled in the art to which it appertains to make and use the same.

This invention relates to brakes for hand trucks, and the primary object of the invention is the provision of a manually operated brake mechanism for use upon ordinary ware house hand trucks which embodies brake shoes for frictionally gripping the periphery of the rear wheels of the truck for arresting movement of the truck and to retard the speed of travel of the truck when descending an incline.

Another object of this invention is to provide a novel form of connection between the hand operated lever and the friction brake shoes for synchronously operating shoes upon both sides of the rear wheels of the truck.

With the foregoing and other objects in view this invention consists in such novel features of construction, combination and arrangement of parts as will be hereinafter more fully described, illustrated in the accompanying drawings and claimed.

Figure 1:
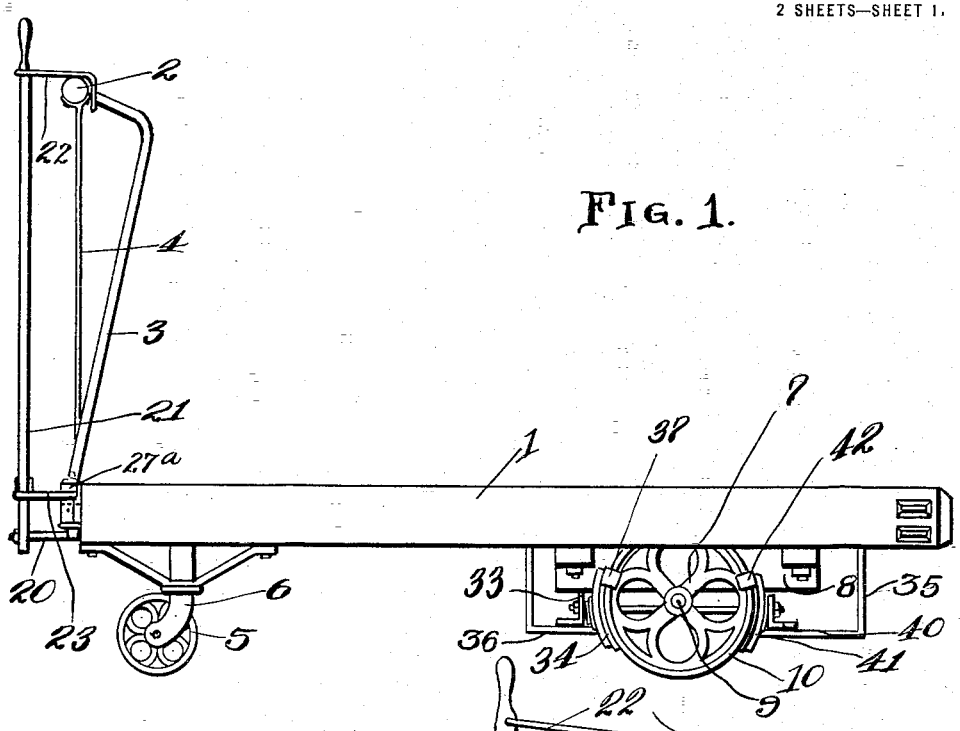
Figure 2:
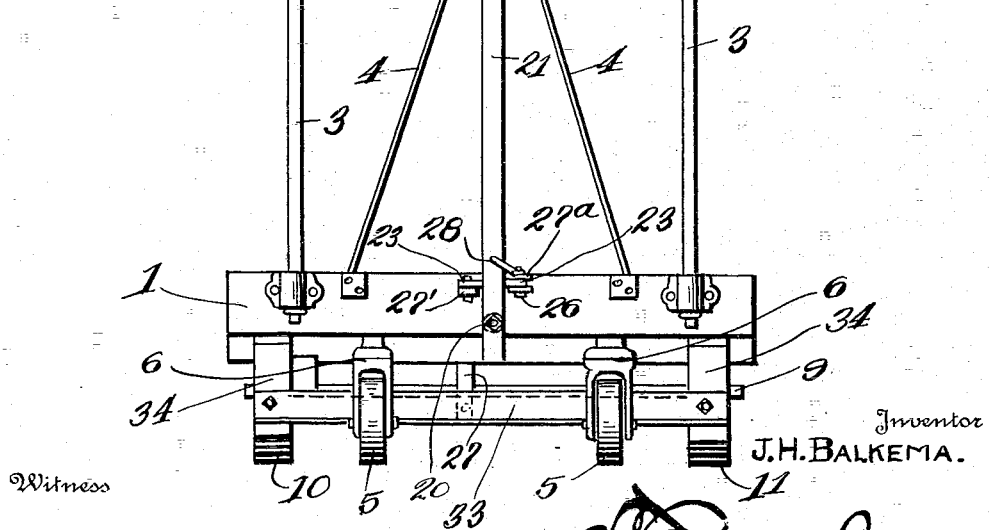

In describing the invention in detail reference will be had to the accompanying drawings wherein like characters designate like or corresponding parts throughout the several views, and in which:

Figure 1 is a side elevation of a ware house truck showing the improved brake mechanism applied thereto. Fig. 2 is an end view of the truck. Fig. 3 is a top plan view of the brake mechanism showing the same applied to a truck which is illustrated in dotted lines, and Fig. 4 is a central sectional view through the truck showing the improved brake applied thereto.

Referring more particularly to the drawings, 1 designates the supporting platform of an ordinary type of ware house truck, which has the handle 2 supported by suitable handle supporting rods 3 carried by one end thereof, the handle 2 is braced by suitable bracing rods 4 which are secured to one end of the truck body 1. The truck body 1 has supported beneath its forward end traction wheels 5, which are connected to swiveled bearings 6 so as to facilitate the manual guiding of the truck during the pushing of the same.

The platform 1 has rear trucks 7 secured to the under surface thereof, which trucks comprise suitable cross supporting bars 8, a rear axle 9 and rear wheels 10 and 11 which are mounted upon the spindles (not shown) of the rear axle.

The forward end of the truck platform 1 has a rod 20 secured thereto and projecting forwardly and longitudinally therefrom, upon the outer end of which rod is mounted a hand lever 21. The hand lever 21 extends upwardly from the rod 20, upon which it is pivotally mounted above the handle 2 and it is held against accidental movement by a suitable hook or fastening member 22, which is secured to the hand lever 21 and engages the handle 2 and one of the supporting rods 3 thereof.

The lever 21 has secured thereto a short distance upwardly from the pivoted end thereof, an angled lever 23. The angled lever 23 is pivotally mounted at the point of connection of its arms 24 and 25 upon a bolt 26, which extends through a pair of ears 27ª. The ears 27ª are secured in any suitable manner to the forward end of the truck platform 1. If it is so desired, the angled lever may be mounted upon an angled bolt (not shown), and the ears 27ª eliminated. The arm 24 of the angled lever 23 is connected to the hand lever 21 by any suitable type of fastening means indicated at 28, so that upon the oscillation of the hand lever 21 the angled lever 23 will be moved or rocked upon its pivotal point in a horizontal plane. The arm 25 of the angled lever 23 has loosely connected to the terminal end thereof a rod 27′, which extends rearwardly along the central portion of the under surface of the truck platform 1 and is connected to a bar 27, which bar is provided with a semi-spherical bearing 30' formed therein equi-distant of its ends, which semi-spherical bearing rides upon the rear axle 9 of the truck structure.

A strap 29 is secured to the bar 27 and it is provided with a substantially semi-spherical shaped bearing 30, which alines with the semi-spherical bearing 30' formed in the bar 27 and forms a complete bearing for the rear axle of the truck and firm manner of pivotally mounting the bar 27 upon the axle. The lower end 31 of the bar 27 depends below the axle 9 and has connected thereto a plurality of rods 32, which rods extend forwardly from the lower end of the bar and are connected to angled irons 33. The angled irons 33 have secured to their terminal ends friction brake shoes 34, which engage the forward portion of the periphery of the rear traction wheels 10 and 11 of the truck structure. The brake shoes 34 have guiding plates 37 formed thereupon which engage the sides of the rims of the wheels for preventing the brake shoes from slipping off the peripheries of the wheels. The bar 27 has rods 38 connected thereto and positioned upwardly from the axle 9 and upon the opposite sides thereof from the bars 32. These bars extend rearwardly from the bar on the axle and are connected to angle irons 40, which extend completely across the width of the truck, as do the angle irons 33. The angle irons 40 have friction brake shoes 41 secured thereto which engage the peripheries of the rear traction wheels 10 and 11. The brake shoes 41 have guiding plates 42 secured thereto which serve purposes analogous with the guiding plates 37. A rod 27' which connects the bar 27 and the angled lever 23 is positioned for longitudinal movement transversely of the direction of the oscillatory movement of the lever 21.

Depending from the under surface of the platform 1 is a pair of substantially U-shaped supporting brackets 35. These supporting brackets are located adjacent the opposite longitudinal sides of the platform 1 and have their horizontal connecting portions 36 extending beneath and forming seats for the brake beams 33 and 40.

In the operation of the improved hand brake truck heretofore specified: When it is desired to apply the brake to the rear traction wheels 10 and 11 of the ware house truck structure, the hook or fastening means is raised for engagement with the handle 2 and the supporting rod 3 and the lever 21 is oscillated or moved upon its pivotal support 20, which rocks the angle lever 23 in a horizontal plane, moving the ends of the arm 25 to which the rod 27' is connected forwardly, and consequently sliding the bar 27' longitudinally beneath the under surface of the truck platform 1. The forward longitudinal sliding movement of the rod 27' will rock the bar 27 upon the rear axle of the truck and consequently move the rods 32 and 38 for forcing the friction shoes 41 and 34 into peripheral engagement with the rear wheels for retarding the movement or speed of movement of the truck.

From the foregoing description taken in connection with the accompanying drawings the advantages of construction and of the method of operation of the improved hand brake for trucks will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In combination with a ware house truck embodying a platform, a rear axle carried thereby, traction wheels mounted upon said rear axle, an upright handle secured to the front portion of said platform, of friction brake shoes for peripheral engagement with said traction wheels, an upright lever pivoted to the front of said platform intermediate the longitudinal edges thereof and extending to a point above the handle, means for operatively connecting said lever and said brake shoes, and means carried by said handle for locking said lever against accidental movement.

2. The combination with a ware house truck of ordinary construction embodying a platform, a rear axle carried thereby, traction wheels mounted upon said rear axle, and an upright handle secured to the front portion of said platform, of friction brake shoes for peripheral engagement with said traction wheels, an upright lever pivoted to the front of said platform intermediate the longitudinal edges thereof and extending to a point above said handle, means for operatively connecting said lever and said brake shoes, a hook pivoted to the upper portion of said lever and adapted to engage said handle, thereby preventing accidental movement of said lever.

3. The combination with a ware house truck of ordinary construction embodying a platform, a rear axle supported thereby, traction wheels mounted upon said rear axle, of friction brake shoes for peripheral engagement with said traction wheels, a rod slidably mounted on the under side of said platform and operatively connected to said brake shoes, a bell crank pivoted in a horizontal plane to the front end of said platform and having one of its arms secured to said rod, an upright lever pivoted to the front of the platform and having its lower end secured to the end of said bell crank remote from the end of the bell crank which is secured to said rod, whereby said brakes are operated by swinging movement of said upright lever, and means for preventing accidental movement of said lever.

In testimony whereof I affix my signature in presence of two witnesses.

JACOB H. BALKEMA.

Witnesses:
WM. BENTE,
P. J. HOEKZEMA.

Copies of this patent may be obtained for five cents each, by addressing the "Commissioner of Patents, Washington, D. C."